United States Patent [19]
Shen
[11] 3,855,615
[45] Dec. 17, 1974

[54] NOISE REDUCTION APPARATUS EMPLOYING PARAMETRIC FREQUENCY DIVIDERS WITH LARGE DIVISION FACTORS

[76] Inventor: Michael T. Shen, 8 Place Dargent, Eich, Luxembourg

[22] Filed: Jan. 22, 1973
[21] Appl. No.: 325,673

[52] U.S. Cl. .... 360/30
[51] Int. Cl. .... G11b 5/04
[58] Field of Search .... 178/6.6 A, DIG. 3; 179/100.2 K; 360/30

[56] References Cited

UNITED STATES PATENTS

| | | | |
|---|---|---|---|
| 3,324,243 | 6/1967 | Ratner et al. | 360/30 |
| 3,704,341 | 11/1972 | Fujita | 178/6.6 A |
| 3,742,127 | 6/1973 | Bruch | 178/6.6 A |

*Primary Examiner*—Bernard Konick
*Assistant Examiner*—Robert S. Tupper
*Attorney, Agent, or Firm*—Arthur L. Plevy

[57] ABSTRACT

There is disclosed a record-playback apparatus which employs a relatively high frequency conversion oscillator as a carrier source for impressing thereon by means of a modulator an information bearing signal encompassing a given range of frequencies. The high frequency FM signal is divided by a parametric divider to develop at an output a low frequency FM signal, wherein this signal is centered about a frequency for optimum tape response. A playback scheme retrieves the signal recorded on the tape, multiplies the same by the division factor, discriminates the signal to provide at an output the original information bearing signal, which can then be applied to speakers or some suitable display, as a television receiver in the case of video information signals.

10 Claims, 5 Drawing Figures

NOISE REDUCTION APPARATUS EMPLOYING PARAMETRIC FREQUENCY DIVIDERS WITH LARGE DIVISION FACTORS

BACKGROUND OF INVENTION

This invention relates to an information recording system in general and more particularly to a modulation system employing large factor dividers and multipliers to develop a signal which can be recorded and played back at a low frequency on a suitable medium such as magnetic tape.

Since the advent of the modern recording tape made of mylar and oxide particles and ac bias for improved signal-to-noise ratio, magnetic tape recording has been extensively used both for the consumer industry as well as for broadcasting and professional recording.

Originally, innovators of tape systems felt that the signal-to-noise ratio available with tape was almost limitless. This concept was quickly discarded and in fact the signal-to-noise ratio was not limitless. Consequently, many other improvements in tape, electronics, heads and drive mechanisms have further increased signal-to-noise ratio. Thus, tape recorders are widely utilized in the consumer and broadcasting fields. In any event, there has been constant effort to improve signal-to-noise ratio and the prior art is replete with a number of patents which attempt to do so by improved tape, improved drive systems and improved electronic assemblies, as well as improvements in various other tape recording apparatus.

In any event, it might be said that no matter how good the properties of the magnetic material, the base material and the binder used in the tape, the fabrication of the tape determines how good it will be or how high the signal-to-noise ratio will be.

Tape properties which are dependent on the fabrication include uniformity of output and "ac" signal-to-noise ratio. The signal-to-noise ratio of a tape recorder is measured by recording an intense signal with a given maximum amount of distortion. One then notes the level of the signal, and then the level of the residual noise when the signal is turned off. This basically determines the "ac" signal-to-noise ratio and is largely dependent on the number of particles in the coating. Basically, a tape with the larger number of particles will have a better signal-to-noise ratio. Uniformity of particle size and distribution also affects the signal-to-noise ratio as the desired signal to be recorded will be amplitude modulated due to tape discontinuities.

To circumvent these problems, the prior art departed from amplitude modulated recording (AM) to frequency modulated (FM) recording, although FM recording is not widely used in consumer tape recorders.

In current FM recording, the input signal or information signal modulates an oscillator, the output (high frequency) is recorded on the tape. Typically, the technique uses a saturation recording as the FM carrier is applied to the recording head at such an amplitude to saturate the tape in one direction or the other.

The function of the tape is to therefore store the axis crossing of the FM signal.

The FM recording system usually provides a 10 to 15 decibel improvement in signal-to-noise ratio over AM recording at a given tape speed.

Noise in such system is limited almost entirely to flutter noise of the recorder and "AM" noise is relatively unimportant. Thus, when an FM record system is operated with proper limiting, the output is relatively insensitive to AM produced by recorder and tape noise. In any event, the flutter noise has been eliminated by simultaneously recording a steady carrier signal on an adjacent track and playing back this signal through a separate discriminator. The output of the separate discriminator then provides a signal representative of flutter. This "flutter signal" can then be applied to the information processing discriminator to compensate its operation for much of the flutter noise. This technique can provide improvements of signal-to-noise ratios of 6 to 12 decibels.

There are other techniques as well to eliminate flutter.

In any event, most available tapes as well as recorders have optimum response within the range of 2 to 6 KHZ.

It is therefore an object of the present invention to provide apparatus capable of producing for subsequent recording a low frequency FM signal, where the FM carrier frequency is selected to be within the range of optimum tape response. This apparatus inherently requires improved frequency dividers which are simple in structure and easy to fabricate while providing high factor dividing capabilities.

DESCRIPTION OF EMBODIMENT OF INVENTION

Apparatus for converting an information bearing signal containing frequency components within a given range to a low frequency modulated signal for improved noise operation when applied to an audio tape, comprises a conversion oscillator capable of providing at an output a stable signal of a frequency substantially larger than any frequency component of said information bearing signal, the conversion oscillator signal is modulated by the information bearing signal to develop a high frequency carrier FM signal, which signal is then divided by a parametric frequency divider including a graded junction varactor to divide the signal by a large division factor with good linearity. The output of the divider provides a low frequency FM signal wherein the range of that signal is within an optimum response range of audio tape. The division factor is larger than the ratio of the conversion oscillator frequency and a center frequency within the frequency range of said information bearing signal.

The parametric divider operates with extreme efficiency and linearity with a simple circuit configuration due to the nature and operating characteristics of the varactor diode.

DETAILED DESCRIPTION OF FIGURES

Figure 1:
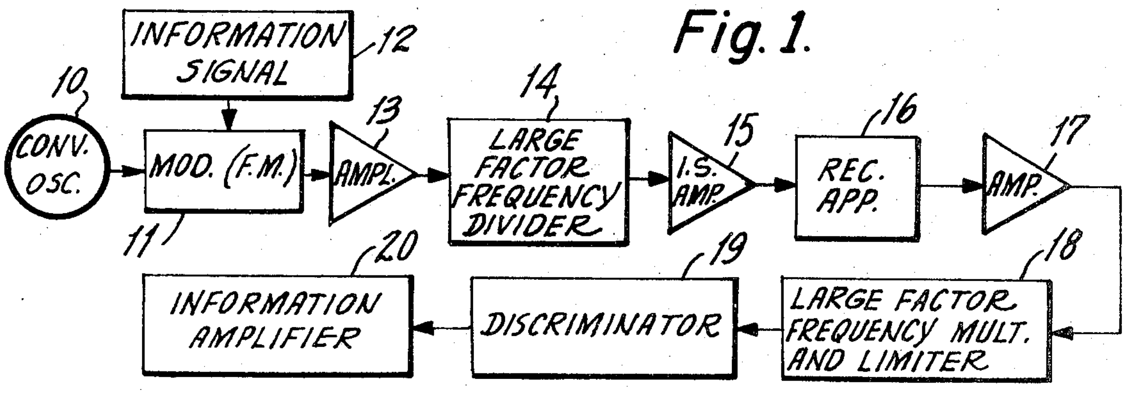
FIG. 1 is a block diagram of a signal information recording and playback system according to this invention.

Referring to FIG. 1 there is shown a conversion oscillator 10. The conversion oscillator 10 may be a crystal controlled oscillator configuration whose frequency is relatively accurate and stable. Such oscillator configurations are known in the art and are not considered to be part of this invention.

For purposes of explanation, it will be assumed that the conversion oscillator 10 is operating at a frequency of 500KHZ, although, as will be explained, other frequencies, higher or lower, can be used as well and ranges of 200KHZ to 50MHZ can be used.

The output of conversion oscillator 10 is applied to one input of an FM modulator 11. The FM modulator 11 may be of the balanced type and serves to provide an FM signal at the output which has a carrier frequency determined by the frequency of conversion oscillator 10 and modulation components determined by the rate of an information signal. The information signal may be an audio signal (20HZ to 20KHZ) and is applied to the other input of modulator 11 from information signal source 12. Modulators as 11 for providing an FM signal are also known in the art and many examples of suitable circuits for modulator 11 exist. The output FM signal from modulator 11 is applied to an amplifier 13. The function of amplifier 13 is to provide gain and isolation for driving a large factor frequency divider 14 with the FM modulated carrier signal.

It is this circuit which enables simple and inexpensive operation. For example, the carrier frequency emanating from conversion oscillator 10 is 500KHZ. As indicated, an optimum response range for magnetic tape is between 2KHZ and 6KHZ. If one desired to divide the FM signal to be within this range, a division factor of at least 100 would be required to provide a 5KHZ signal at the output of divider 14. The division factor of 100 is quite large and of further consideration is the fact that the signal to be divided is an FM signal. Such a signal of course contains sideband frequencies due to the modulation process. These sidebands as is well known contain the information characteristics of the signal. Hence, large factor division is required with linear response. Linearity is important so as not to change the characteristics of the FM signal as distortion of sideband content would seriously affect the quality of the signal recovered.

Thus, the specifications imposed upon divider 14 are considerable. In view of this, the further factor of circuit economics exist in that the divider circuit 14 should be easy to fabricate and inexpensive to implement. These features are available in the divider configuration to be described.

If divider 14 provides a large factor division of one hundred, then the FM signal available at the output of divider 14 is concentrated about 5KHZ. If the divider performs linearly the sideband content will be unaffected.

The output of the divider 14 is applied to an isolation amplifier as an emitter follower circuit or a preamplifier 15. The output from isolation amplifier 15 is applied to the input amplifier of a tape recorder, which may be a conventional tape deck arrangement and as such could be a longitudinal reel recorder, a casette device and so on, typical of many available commercial recorders. The recorder then serves to store the divided FM signal on the magnetic tape at a carrier frequency between 2KHZ and 6KHZ. Recording of this low frequency FM signal assures that undesired amplitude modulated noise factors are eliminated as well as those noise components which, as described above, affect ac signal to noise operation. There is also no requirement for equalization as the FM signal as divided is within a narrow frequency spectrum.

The recorded signal on the magnetic tape can then be retrieved during a playback mode, by coupling the signal from the playback head of the recorder to a playback amplifier 17. The output from amplifier 17 is applied to the input of a large factor frequency multiplier 18 which multiplies the low frequency FM signal by the same factor the original FM signal was divided by. In this example, the factor would be 100.

The output of the multiplier 18 is applied to an FM discriminator 19, which may be a ratio detector or Foster-Seely discriminator. Discriminator 19 is responsive to the FM signal to provide the original information signal at the output. This signal can then be applied to amplifier 20 which amplifier can drive a typical utilization means as a speaker, a display and so on.

Figures 2, 3, 4:
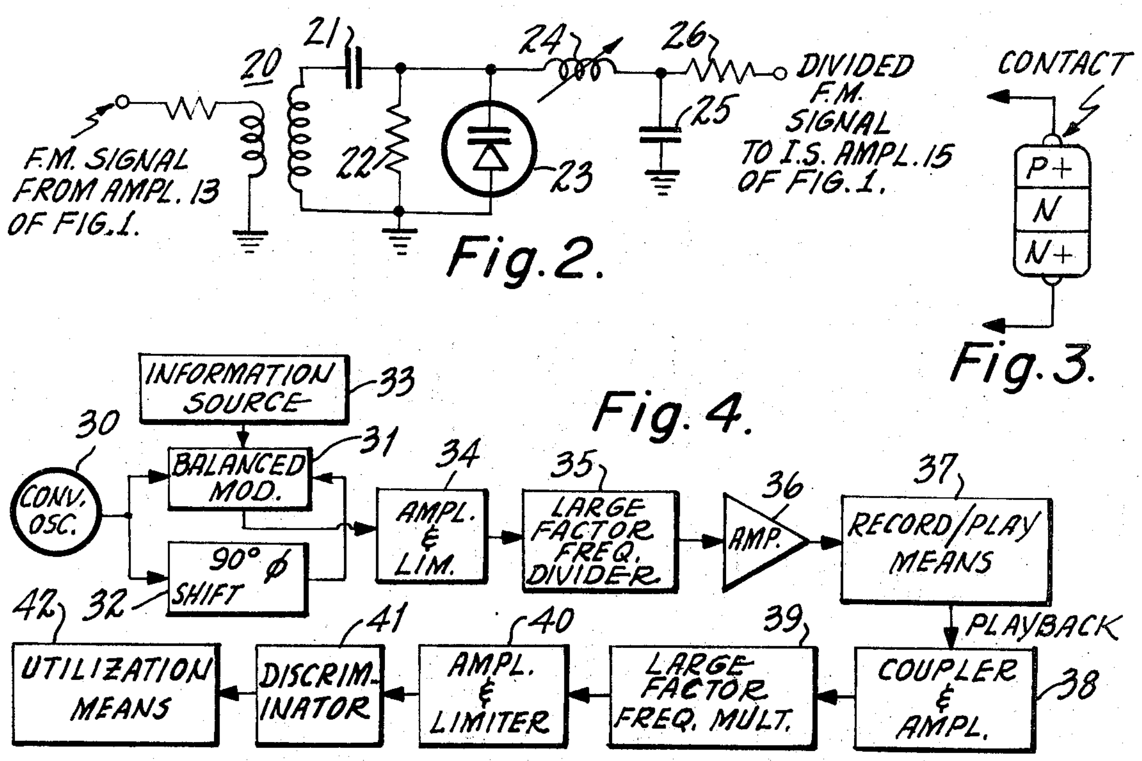
FIG. 2 is a schematic diagram of a large factor parametric frequency divider according to this invention.
FIG. 3 is a diagramatic view of a varactor diode used in operation of the apparatus of this invention.
FIG. 4 is a block diagram of an alternate embodiment of a record and playback system according to this invention.

Referring to FIG. 2 there is shown a schematic diagram of a large factor frequency divider circuit exhibiting linear division for an FM signal. The input FM signal is applied to the primary winding of a radio frequency transformer 20. The secondary winding has more turns than the primary to provide a voltage step up. A coupling capacitor 21 is selected to tune the secondary about the FM carrier frequency (500KHZ). A resistor 22 acts as a terminating impedance for the transformer and has one terminal coupled to a terminal of capacitor 21 and the other terminal coupled to a point of reference potential. The resistor 22 is shunted by a varactor diode 23, which as will be described, operates in a parametric mode. The diode 23 is of main concern in providing large division factors and linearity. The output circuit comprises an inductor 24 in series with a capacitor 25. The combination of inductor 24 and capacitor 23 are tuned to the desired divided signal frequency, in this example, 5KHZ. A resistor 26 provides isolation of the output for coupling to a suitable amplifier circuit, as 15 of FIG. 1. While the exact operating mechanism of the divider shown in FIG. 2 is not clearly understood, it is believed that the diode 23 is responsible for highly efficient parametric dividing action with good linearity for all sidebands.

The varactor diode 23 utilized as shown in FIG. 3 is a P + N, N + device. A first P-region is highly doped with P type impurities such as boron, gallium, indium or aluminum, which are known as trivalent impurities and form covalent bonds with silicon or germanium. These doping techniques are known. The P + region is heavily doped with these acceptor impurities and is followed by an N region which region is lightly doped with pentavalent impurities such as phosphorus, antimony or arsenic. This N region is contiguous with an N + region which is again heavily doped as compared to the N region. The doping levels necessary to develop P + N, N + regions are known in the art for both germanium and silicon.

The varactor diode 23 is a silicon device with a zero bias capacitance of 90 picofarads and a reverse breakdown voltage of 80 volts. The diode area is about one square millimeter and the junction between the P + N, N + regions is graded because of the above noted impurity concentration to afford a graded junction characteristic whereby the capacitance varies inversely between the square and cubic root of the applied voltage.

In the configuration shown, the FM input signal acts as a pump source for the varactor diode, the capacitance of the diode 23 varies according to the voltage of the FM input signal and provides a plurality of frequency components. Since the output of the divider is tuned at the desired frequency of 5KHZ, this signal as well serves to activate the diode, thus enhancing operation at the desired output.

Due to the fact that the diode has a relatively large zero bias capacity and a graded junction, an effective division of 100 times is available at large signal output with linear behavior.

The divider shown in FIG. 2 was tested at a wide range of FM carrier frequencies and the results obtained verified unanticipated circuit operation. For example, a divider according to that shown was built using the following components:

| | |
|---|---|
| Transformer 20 | 4 turns No. 20 wire primary on powered ion core, 25 uhenry secondary |
| Capacitor 21 | 100 picofarads |
| Resistor 22 | 47,000 ohms |
| Diode 23 | Silicon P + N N + 90 picofarads with zero bias |
| Inductor 24 | Variable Miller coil (65 – 300 millihenrys) |
| Capacitor 25 | .01 microfarads |

To ascertain linearity and division ratio, a 5 MHZ carrier was applied to the primary wiring with an FM excursion of 60KHZ, representing an audio signal. A division factor of 1,418 was obtained to develop at the output a 3.6KHZ signal. The signal reduced by a factor of over fourteen hundred times was linearly related to the high frequency FM signal. The low FM signal showed excursions of 75 cycles for the 60KHZ excursion of the high frequency FM, and was completely linear. At the reduced division factor of 100, the components were scaled and the circuit operates with greater efficiency. With the above noted signals, the input FM signal was 0.55 volts rms and the output signal after a division of 1,400 times was 0.25 volts rms. At the lower frequency division ratio, the amplitudes were approximately the same. The efficiency of operation being due to the parametric operation of the graded junction diode. It is believed that the divider may be able to provide division factors approaching 5,000 times or more.

The low frequency FM signal obtained from divider 14 is recorded on a conventional audio tape 16 at an optimum low frequency.

Playback of this signal is accomplished in a relatively conventional manner. The recorded low frequency FM signal is played back via a magnetic head, the signal is applied to an amplifier 17 and thence to a large factor multiplier 18.

The multiplier 18 is not as critical in operation as the divider. The multiplier, for example, can comprise a chain of cascaded multipliers to multiply the low frequency FM signal by 100 or more times. Frequency multipliers are well known in the art and a variety of such devices can be used in cascade to obtain the desired multiplied signal. The frequency multiplier provides amplitude modulation as the multiplying factor becomes larger. See for example *Electronic & Radio Engineering* by F. E. Terman (4th Edition) published by McGraw-Hill, pages 473–477. However, the output signal is limited as all one is concerned with is retrieving the modulation components which are FM.

The multiplied FM signal is applied to a discriminator where the audio signal is retrieved, amplified and used.

Thus, the low frequency FM signal recording eliminates much of the undesired noise found in conventional recorders. This is accomplished, as above, by the configuration shown.

Referring to FIG. 4 there is shown an alternate embodiment of the noise reduction record and playback system.

A conversion oscillator 30, operates to provide a stable FM carrier wave. The carrier wave is applied to a balanced modulator configuration 31. The balanced modulator is well known and serves to provide a carrier signal only when an information signal is present. The operation of balanced modulators 31 operate to assure that the output FM signal is relatively free from spurious harmonic products provided during a modulation process and requires simpler filtering at the output. To accomplish this this FM carrier is also applied to another input of the modulator 31 via a ninety degree phase shift network 32. The information source 33 may be an audio signal or a video signal, as from a camera, tape recorder and so on. The high frequency modulated carrier is applied to an amplifier and limiter 34 and then to a large factor frequency divider 35 operating in a parametric mode to perform linear and high scale division.

The output of divider 35 is the low frequency FM signal which is isolated and amplified by amplifier 36. This low frequency FM signal is then applied to the record circuit of a tape machine 37.

The playback mode is accomplished as previously described by playback via an appropriate head of the recorded low FM signal which signal is applied to a coupler and isolation amplifier 38. The signal from amplifier 38 is applied to a large factor multiplier 39, which as will be described, can be a parametric frequency multiplier. The multiplier 39 multiplies the low FM signal by the correct integer to provide at the output the high FM signal. This signal is limited and amplified in stage 40 and thence detected by means of discriminator 41. Thus, the original information signal, as provided by source 33 is available at the output of discriminator 41 and is applied to utilization means 42 for application to speakers, a television receiver and so on.

While the above description concentrated on carrier frequencies of 500KHZ, the fact is that the conversion oscillator could also operate at frequencies from 200KHZ to 50MHZ or more, thus accommodating a plurality of different repetition rate information sources 33.

This enables audio and video recording as the divider shown can linearly divide by factor of 1,000 times or more.

As indicated, the divider used to provide large dividing factors with linearity enables the system to provide low frequency FM signals with relative ease and with good economics.

Figure 5:
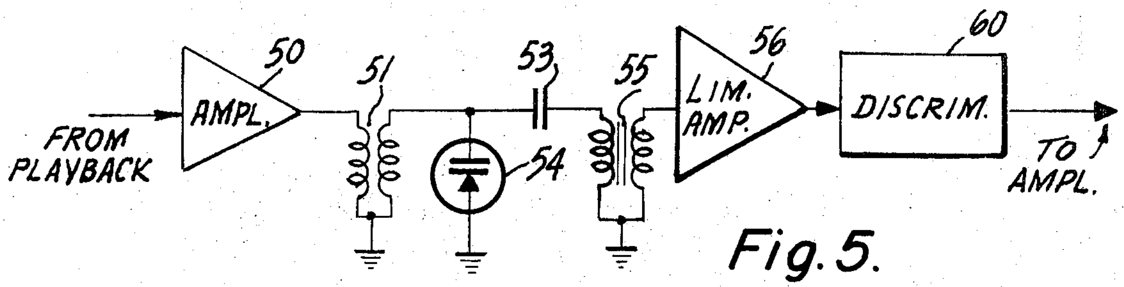
FIG. 5 is a schematic circuit diagram partly in block form of an FM multiplier useful in practicing this invention.

While the multipliers as 18 and 39 of FIG. 1 and 4 could be conventional in structure, it has been determined that a parametric multiplier as shown in FIG. 5 provides unique and unanticipated operating characteristics in combination with the noise reducing techniques afforded by the system described.

Referring to FIG. 5 there is shown a parametric multiplier which will operate with the above apparatus.

The multiplier employs an input amplifier which amplifies the low frequency FM signal recovered from the tape or recording means.

A parametric diode 54, which is a silicon graded junction device as the P + N, N + device used in the divider is activated by the low frequency FM signal 51 to provide a plurality of harmonic frequency components.

The parametric frequency multiplier was built with the varactor 23 of FIG. 2 as previously described. The input consisted of an RF transformer 51 having a 600ohms input impedance. The varactor 54 was coupled through a 100 picofarad capacitor. The 100 picofarad capacitor was resonated with the secondary of the output transformer 55 at 3.00MHZ. The input frequency was at 10KHZ and the output was obtained at 3MHZ. The multiplier performs linear multiplication over an input signal range from 9.512 to 9.602KHZ to obtain 2.949 to 2.977MHZ at the output. The multiplier operating linearly over this range to thus obtain an effective multiplication of 300 times with the above described single stage parametric multiplier. The multipled signal was applied to a limiting amplifier 56 to obtain a large factor linear multiplied signal.

While the above noted description concentrated on the use of audio magnetic tape, it is also understood that the low frequency FM signals provided could be used with conventional records as are normally available.

I claim:

1. Apparatus for converting an information bearing signal including components within a given frequency range into a low frequency modulated signal for improved noise operation when applied to an audio magnetic tape, comprising:

a. a conversion oscillator capable of providing at an output a stable signal, having a frequency substantially larger than any frequency component of said information bearing signal, b. modulating means responsive to said conversion oscillator signal and said information bearing signal to provide at an output a frequency modulated (FM) signal with the carrier of said FM signal at said conversion oscillator frequency and modulated according to said information bearing signal, and c. a parametric frequency divider having an input responsive to said FM signal to divide said signal by a factor greater than 100 as defined by the ratio of said carrier frequency and a center frequency within said frequency range of said information bearing signal, to provide at an output a low frequency FM signal capable of being recorded on a audio magnetic tape.

2. The apparatus according to claim 1 wherein said low frequency FM signal is between 2KHZ and 6KHZ.

3. The apparatus according to claim 1 wherein said conversion oscillator frequency is between 200KHZ to 50MHZ.

4. Apparatus for converting an information bearing signal including components within a given frequency range into a low frequency modulated signal for improved noise operation when said low frequency modulated signal is recorded on an audio magnetic tape, comprising:

a. a source of relatively stable oscillations having a frequency greater than any frequency within said frequency range of said information bearing signal, b. a modulator responsive to said stable oscillations and said information bearing signal to provide at an output a first frequency modulated (FM) signal with a carrier substantially at said frequency of said stable source, and c. a frequency divider of the type exhibiting a parametric operation including a graded junction varacator diode having an input terminal responsive to said FM signal for providing at an output terminal a low frequency FM signal at a carrier substantially less than said carrier of first signal but integrally related thereto, said low frequency FM signal capable of being recorded on said audio magnetic tape due to said carrier being at a frequency within an optimum range, said frequency divider operative to divide said FM signal by a factor between 100 to 2,000 times.

5. The apparatus according to claim 4 wherein said graded junction varactor diode included in said divider is a P + N, N + device fabricated from silicon.

6. The apparatus according to claim 4 wherein said utilization means includes a power amplifier having an input coupled to the output of said discriminator and an output capable of activating an audio speaker system.

7. The apparatus according to claim 4 wherein said FM signal is a video signal such as that used in a television system.

8. The apparatus according to claim 4 further including apparatus for reading said low frequency FM signal from an audio tape, comprising:

a. a frequency multiplier circuit including a varacator diode having an input responsive to said low ferquency (FM) signal to provide at an output thereof a multiplied signal at a carrier substantially equal to said carrier of said first signal, b. a discriminator responsive to said multiplied signal to provide at an output said information bearing signal, and c. utilization means coupled to said output of said discriminator for displaying said information bearing signal.

9. The apparatus according to claim 8 wherein said varactor diode included in said multiplier is a P + N, N + device fabricated from silicon.

10. Apparatus for converting an information bearing signal including components within a given frequency range into a low frequency modulated signal for improved noise operation when applied to an audio magnetic tape, comprising:

a. a conversion oscillator capable of providing at an output a stable signal, having a frequency substantially larger than any frequency component of said information bearing signal, b. modulating means responsive to said conversion oscillator signal and said information bearing signal to provide at an output a frequency modulated (FM) signal with the carrier of said FM signal at said conversion oscillator frequency and modulated according to said information bearing signal, and c. a frequency divider having an input responsive to said FM signal to divide said signal by a factor greater than one hundred as defined by the ratio of said carrier frequency and a center frequency within said frequency range of said information bearing signal, to provide at an output a low frequency FM signal capable of being recorded on a audio magnetic tape.

* * * * *